US011448597B2

(12) United States Patent
Son et al.

(10) Patent No.: US 11,448,597 B2
(45) Date of Patent: Sep. 20, 2022

(54) METHOD FOR MONITORING DRY STATE OF ELECTRODE SUBSTRATE

(71) Applicant: LG Chem, Ltd., Seoul (KR)

(72) Inventors: Jin Young Son, Daejeon (KR); Moo Yong Shin, Daejeon (KR); Taek Soo Lee, Daejeon (KR); Cheol Woo Kim, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 17 days.

(21) Appl. No.: 16/652,290

(22) PCT Filed: Dec. 17, 2018

(86) PCT No.: PCT/KR2018/016061
§ 371 (c)(1),
(2) Date: Mar. 30, 2020

(87) PCT Pub. No.: WO2019/135508
PCT Pub. Date: Jul. 11, 2019

(65) Prior Publication Data
US 2020/0240915 A1   Jul. 30, 2020

(30) Foreign Application Priority Data

Jan. 8, 2018   (KR) .................. 10-2018-0002265

(51) Int. Cl.
*G01N 21/57*   (2006.01)
*H01M 4/04*   (2006.01)
(Continued)

(52) U.S. Cl.
CPC .......... *G01N 21/57* (2013.01); *H01M 4/0404* (2013.01); *G01N 15/14* (2013.01);
(Continued)

(58) Field of Classification Search
CPC .... G01N 21/25; G01N 21/35; G01N 21/3554; G01N 21/47; G01N 21/57; G01N 21/65;
(Continued)

(56) References Cited

U.S. PATENT DOCUMENTS 5,010,659 A * 4/1991 Treleven ............... F26B 3/283
                                                    34/269
5,433,973 A * 7/1995 Wallack ................. G11B 5/84
                                                    427/128
(Continued)

FOREIGN PATENT DOCUMENTS

JP   2002039723 A   2/2002
JP   2002273308 A   9/2002
(Continued)

OTHER PUBLICATIONS

International Search Report for PCT/KR2018/016061 dated Mar. 15, 2019; 2 pages.
(Continued)

*Primary Examiner* — Brian K Talbot
(74) *Attorney, Agent, or Firm* — Lerner, David, Littenberg, Krumholz & Mentlik, LLP (57) ABSTRACT

The present invention relates to an apparatus and method for monitoring a dry state of an electrode substrate in which electrode slurry is applied to a collector. The monitoring method comprises emitting light onto a surface of the electrode substrate; receiving the light reflected by the surface of the electrode substrate; and analyzing a luminous intensity or spectrum of the received light to estimate a drying rate of the electrode substrate.

The apparatus includes a light emitting part emitting light from a light source onto a surface of the electrode substrate; a light receiving part receiving the light reflected by the surface of the electrode substrate; and a computing device analyzing a luminous intensity or spectrum of the received (Continued)

light and comparing analyzed characteristics of the light with the reference data of the reflected light to the drying rate of the electrode substrate.

5 Claims, 5 Drawing Sheets

(51) Int. Cl.
*G01N 21/35* (2014.01)
*G01N 21/47* (2006.01)
*G01N 21/65* (2006.01)
*G01N 21/3554* (2014.01)
*G01N 21/25* (2006.01)
*H01M 4/88* (2006.01)
*G01N 15/14* (2006.01)

(52) U.S. Cl.
CPC ............ *G01N 21/25* (2013.01); *G01N 21/35* (2013.01); *G01N 21/3554* (2013.01); *G01N 21/47* (2013.01); *G01N 21/65* (2013.01); *H01M 4/8882* (2013.01)

(58) Field of Classification Search
CPC ... G01N 15/14; H01M 4/0404; H01M 4/8882
USPC ...................................................... 427/8, 115
See application file for complete search history.

(56) References Cited

U.S. PATENT DOCUMENTS

| | | | | |
|---|---|---|---|---|
| 6,015,593 | A * | 1/2000 | Yonkoski | F26B 13/10 |
| | | | | 427/379 |
| 6,785,982 | B2 * | 9/2004 | Yonkoski | F26B 13/10 |
| | | | | 34/463 |
| 2009/0117419 | A1 * | 5/2009 | Takemoto | H01M 8/0494 |
| | | | | 429/431 |
| 2013/0078365 | A1 * | 3/2013 | Mori | C23C 18/1262 |
| | | | | 427/58 |
| 2013/0202781 | A1 * | 8/2013 | Kobayashi | H01M 4/0404 |
| | | | | 427/58 |
| 2014/0014037 | A1 * | 1/2014 | Watanabe | H01M 4/8882 |
| | | | | 118/713 |
| 2014/0072697 | A1 * | 3/2014 | Hiramatsu | H01M 4/139 |
| | | | | 427/58 |
| 2014/0113063 | A1 * | 4/2014 | Nakano | H01M 4/0471 |
| | | | | 427/8 |
| 2016/0119557 | A1 * | 4/2016 | Hunt | H04N 5/332 |
| | | | | 348/131 |
| 2017/0276429 | A1 * | 9/2017 | Heo | F26B 25/006 |
| 2018/0083261 | A1 * | 3/2018 | Ho | F26B 21/14 |
| 2019/0265167 | A1 * | 8/2019 | Elmore | G01N 21/84 |

FOREIGN PATENT DOCUMENTS

| | | |
|---|---|---|
| JP | 2005172646 A | 6/2005 |
| JP | 2007328979 A | 12/2007 |
| JP | 2010277821 A | 12/2010 |
| JP | 4801233 B1 | 10/2011 |
| JP | 2012164440 A | 8/2012 |
| JP | 2012167959 A | 9/2012 |
| JP | 2012209074 A | 10/2012 |
| JP | 2014116251 A | 6/2014 |
| JP | 2015008075 A | 1/2015 |
| JP | 2016191037 A | 11/2016 |
| KR | 20080095463 A | 10/2008 |
| KR | 20100089319 A | 8/2010 |
| KR | 20130064288 A | 6/2013 |
| KR | 101286003 B1 | 7/2013 |
| KR | 20130076758 A | 7/2013 |

OTHER PUBLICATIONS

Extended European Search Report including Written Opinion for EP18898201.1 dated Oct. 23, 2020; 9 pages.

* cited by examiner

METHOD FOR MONITORING DRY STATE OF ELECTRODE SUBSTRATE

CROSS-REFERENCE TO RELATED APPLICATION

The present application is a national phase entry under 35 U.S.C. § 371 of International Application No. PCT/KR2018/016061, filed on Dec. 17, 2018 which claims priority of Korean Patent Application No. 10-2018-0002265, filed on Jan. 8, 2018, which are hereby incorporated by reference in their entirety.

TECHNICAL FIELD

The present invention relates to an apparatus and method for monitoring a dry state of an electrode substrate, and more particularly, to an apparatus and method for monitoring a dry state of an electrode substrate, which is capable of grasping the dry state of the electrode substrate, which is dried by passing through the inside of a drying device, in real time.

BACKGROUND ART

The demand for secondary batteries as energy sources is rapidly increasing in various fields comprising personal portable terminal and electric vehicle fields.

Unlike primary batteries, rechargeable secondary batteries are being developed not only for digital devices but also for vehicles such as electric vehicles.

Secondary batteries may be variously classified according to materials and outer shapes of a positive electrode and a negative electrode. Particularly, lithium secondary batteries made of a lithium compound material are widely used as power supplies for various devices in place of nickel-cadmium secondary batteries according to the related art because of their large capacity and low self-discharge rate.

Such a lithium secondary battery has a structure in which an electrode assembly for charging and discharging electric energy is built in a case. The electrode assembly has a structure in which a negative electrode, a separator, and a positive electrode are stacked and is built together with an electrolyte in the case (the pouch or cylinder type case or the like).

Each of the positive electrode, the negative electrode, and the separator is made of a material selected in consideration of a battery lifespan, a charging/discharging capacity, a temperature characteristic, safety, and the like. A process in which lithium ions are intercalated and deintercalated into/from the negative electrode from lithium metal oxide of the positive electrode is repeatedly performed to charge/discharge the lithium secondary battery.

The electrodes (the positive electrode and the negative electrode) constituting the electrode assembly generate current through ion exchange, and each of the positive electrode and the negative electrode is manufactured by applying electrode slurry to a surface of a collector made of aluminum or copper foil and then tapping the electrode substrate, on which a drying process is performed, and cutting the electrode substrate into an appropriate size.

In general, the negative electrode has a structure in which a carbon-based active material is applied to the collector made of copper, aluminum, or the like, and the positive electrode has a structure in which an active material comprising $LiCoO_2$, $LiMnO_2$, $LiNiO_2$, or the like is applied to the collector made of aluminum or the like.

Each of the positive electrode active material and the negative electrode active material is applied to a surface of the collector that is in an electrode slurry state in which a solvent and the active material are mixed with each other. That is, the electrode slurry is applied to the surface of the collector to manufacture the electrode substrate. Also, the drying process is performed on the electrode substrate so that the solvent of the electrode slurry is vaporized to cure the electrode active material on the surface of the collector.

Figure 1:
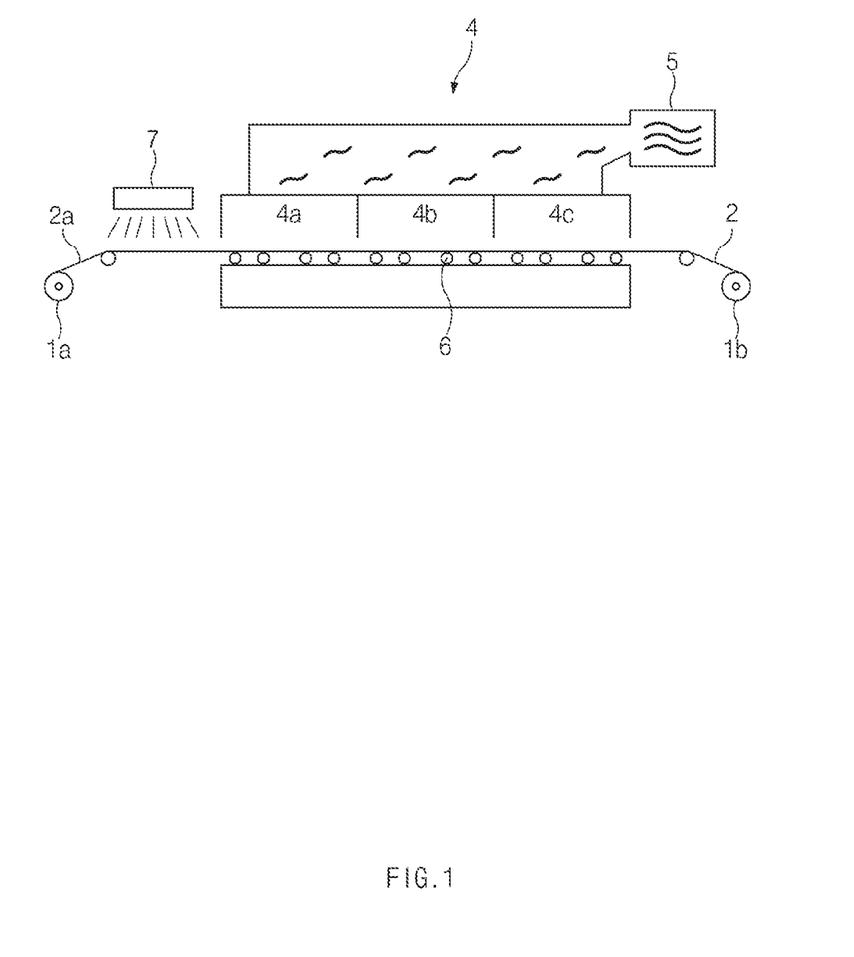
FIG. 1 is a simplified projective view of a drying device for drying an electrode substrate.

That is, as illustrated in FIG. 1, while a collector 2a provided as a metal thin plate is unwound from an unwinding roller 1a and wound around a winding roller 1b, an electrode substrate 2 coated with electrode slurry on a surface of the collector 2a through a coater 7 passes through drying chambers 4a, 4b, and 4c through rollers 6 so as to be dried and then is wound around the winding roller 1b. One or more drying chambers 4a, 4b, and 4c are provided in the drying device 4, and each of the drying chambers 4a, 4b, and 4c is controlled in temperature by a heat source generated in a heater 5.

The drying process requires different drying conditions according to a change in battery capacity and raw material. Particularly, a high loading electrode (an electrode with high charging/discharging capacity per unit area) for manufacturing a high capacity battery requires more precise drying conditions because the electrode substrate becomes thicker.

As a result, it is possible to select a method in which a drying rate increases according to an increase in thickness of the electrode substrate. However, in this case, this may be a main cause of cracks on the surface of the electrode, and also, electrode adhesion may be deteriorated. However, to prevent this problem from occurring, if the drying rate decreases, production yield may be reduced.

However, according to the related art, there is a method in which a thermometer is disposed in the drying chamber, and the drying rate of the electrode substrate is estimated through an internal temperature or estimated by detecting only a surface temperature of the electrode substrate. However, this measurement method may classify the inside of the drying chamber into a preheating section (a section in which a temperature increases)/a constant rate section (a section in which a temperature is constantly maintained)/a decreasing rate section (a section in which a temperature decreases). However, there is a disadvantage in that it is impossible to segment the constant rate section, which occupies most of the electrode drying section.

Thus, in order to dry coating of the high loading electrode while maintaining quality of the electrode, a new measurement method has been required to monitor the dry state of the electrode even in the constant rate section of a dryer.

DISCLOSURE OF THE INVENTION

Technical Problem

Therefore, a main object of the present invention is to provide an apparatus and method for monitoring a dry state of an electrode substrate, which is capable of more efficiently estimating or confirming the dry state of the electrode substrate being dried in a dryer.

That is, since surface gloss of the electrode substrate tends to be changed according to a decrease of a solid content of electrode slurry while the electrode substrate is dried within the dryer, the present invention provides a method of estimating a drying rate through a variation in degree of the surface gloss.

The monitoring method according to the present invention has an advantage in that the dry state is grasped regardless of a temperature within the drying chamber (regardless of external factors) because the drying rate is estimated through the variation in degree of gloss of the electrode slurry.

Technical Solution

To achieve the above object, a method for monitoring a dry state of an electrode substrate in which electrode slurry is applied to a collector according to the present invention: a step of emitting light onto a surface of the electrode substrate; a step of receiving the light reflected by the surface of the electrode substrate; and a step of analyzing a luminous intensity or spectrum of the received light to estimate a drying rate of the electrode substrate.

The electrode slurry may contain a reference material that is changed in reflection characteristic according to the dry state.

According to the present invention, when the electrode slurry reaches a drying rate within a specific range, the reflection characteristic of the reference material may have a section in which the electrode slurry is more sharply changed than that when the electrode slurry is in a drying rate within a different range.

According to an embodiment of the present invention, the reference material may be graphite, preferably, artificial graphite, and the light emitted onto the surface of the electrode substrate may be light having a visible ray band.

According to the present invention, in a state in which reference data exhibiting characteristics of the reflected light according to the drying rate of the electrode substrate is previously written, the characteristics of the received light may be compared with the reference data to estimate the drying rate.

In the monitoring method according to the present invention, a drying device for drying the electrode substrate may be configured so that the electrode substrate is dried by passing through a drying chamber to which heat is applied, and a temperature control of the drying chamber may be performed based on data of the estimated drying rate of the electrode substrate.

Furthermore, the present invention additionally provides an apparatus for monitoring a dry state of an electrode substrate. The apparatus for monitoring the dry state of the electrode substrate in which electrode slurry is applied to a collector comprises: a light emitting part emitting light from a light source onto a surface of the electrode substrate; a light receiving part receiving the light reflected by the surface of the electrode substrate; and a computing device analyzing a luminous intensity or spectrum of the received light and comparing analyzed characteristics of the light with the reference data of the reflected light to the drying rate of the electrode substrate.

The light emitting part and the light receiving part may be mounted to be built together in a probe, and the probe may be disposed so that an end of the probe is spaced a predetermined distance from the surface of the electrode substrate.

According to an embodiment of the present invention, the light receiving part may be disposed at a center within the probe, and a plurality of light emitting parts may be disposed along a circumference of the light receiving part.

Advantageous Effects

Since the present invention having the above-described constituents may grasp the dry state without directly contacting the surface of the electrode substrate, the electrode substrate may be prevented from being damaged or scratched on the surface thereof. In addition, since the electrode substrate is not affected by the internal conditions of the drying chamber, the measured result may be improved in reliability.

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention provides an apparatus and method for monitoring a dry state of an electrode substrate in which electrode slurry is applied to a collector.

According to an embodiment of the present invention, an electrode is a negative electrode, and the collector manufactured as the negative electrode is provided as a copper or aluminum thin plate. The electrode slurry has a structure in which a solvent and a negative electrode active material are mixed with each other and is applied to one surface or both surfaces of the collector. Also, while a drying process is performed on the electrode slurry, the solvent is vaporized to cure the negative electrode active material on a surface of the collector so that the electrode slurry adheres to the collector. Here, although the explanation is made based on the negative electrode, the same or similar principle may be applied in the process of manufacturing a positive electrode.

Hereinafter, preferred embodiments according to the present invention will be described with reference to the accompanying drawings.

Embodiment 1

In this embodiment, a method for monitoring a dry state of an electrode substrate is provided. This embodiment will be considered and described to be performed in a drying device 4 through which the electrode substrate continuously passes. As described above, the drying device 4 is a device in which a collector 2a is unwound from a unwinding roller 1a, and an electrode substrate 2, on which electrode slurry is applied to a surface thereof, is dried, and then the electrode slurry injected or applied to a surface of the collector 2a is heated and dried while the electrode substrate 2 is wound around a winding roller 1b. At least one or more drying chambers 4a, 4b, and 4c are provided between and inlet and an outlet.

In this embodiment, the method for monitoring the dry state of the electrode substrate comprises a step of emitting light onto a surface of the electrode substrate 2 coated with the electrode slurry, a step of receiving the light reflected by the surface of the electrode substrate 2 (the light reflected by the electrode slurry), and a step of analyzing a luminous intensity or spectrum of the received light to estimate a drying rate of the electrode substrate.

Figure 2:
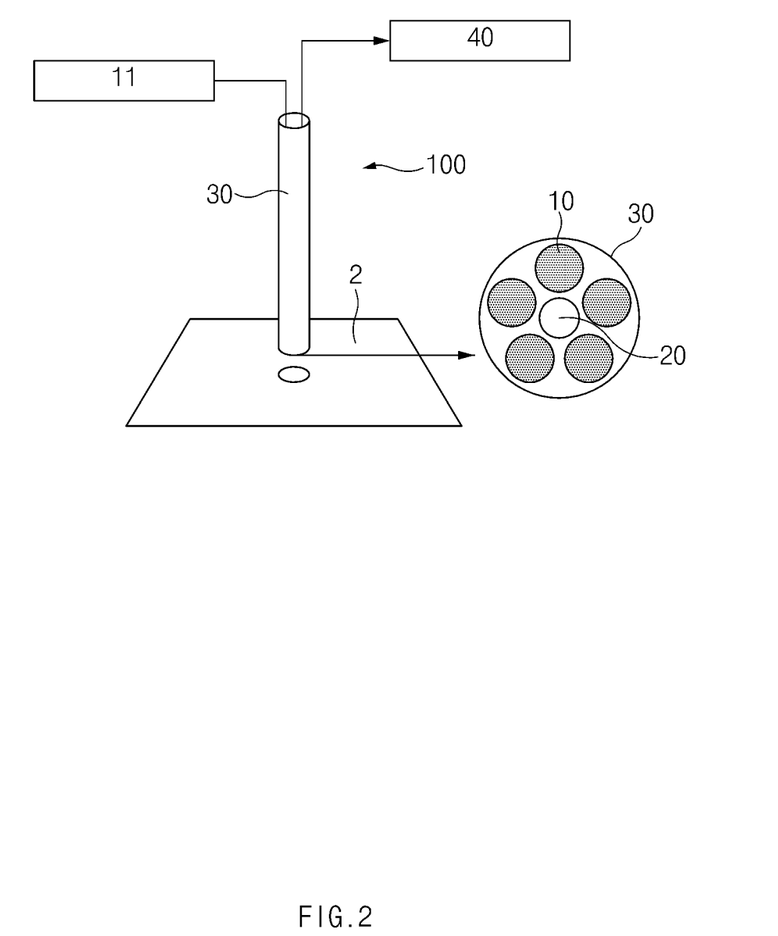
FIG. 2 is a simplified view of a monitoring apparatus according to an embodiment of the present invention.

That is, as illustrated in FIG. 2, a probe 3 is disposed in one or more of the drying chambers 4a, 4b, and 4c. Here, a light receiving part 20 and a light emitting part 10 are built in an end of the probe 30 to emit light onto the surface of the collector coated with the electrode slurry and receive the light through the light receiving part 20. The received light is analyzed by a computing device 40 to determine reflection characteristics.

The electrode slurry according to the present invention contains a reference material having a variable reflection characteristic according to the dry state. Preferably, the reference material is contained to constitute a main component of the active material. When reaching a drying rate within a specific range, the reflection characteristic of the reference material has a section in which the electrode slurry is relatively changed more sharply than that when the electrode slurry is in a drying rate within a different range.

For example, in an embodiment of the present invention, the reference material may be graphite, preferably, artificial graphite, and the light emitted onto the surface of the electrode substrate 2 is light having a visible ray band.

Figure 3:
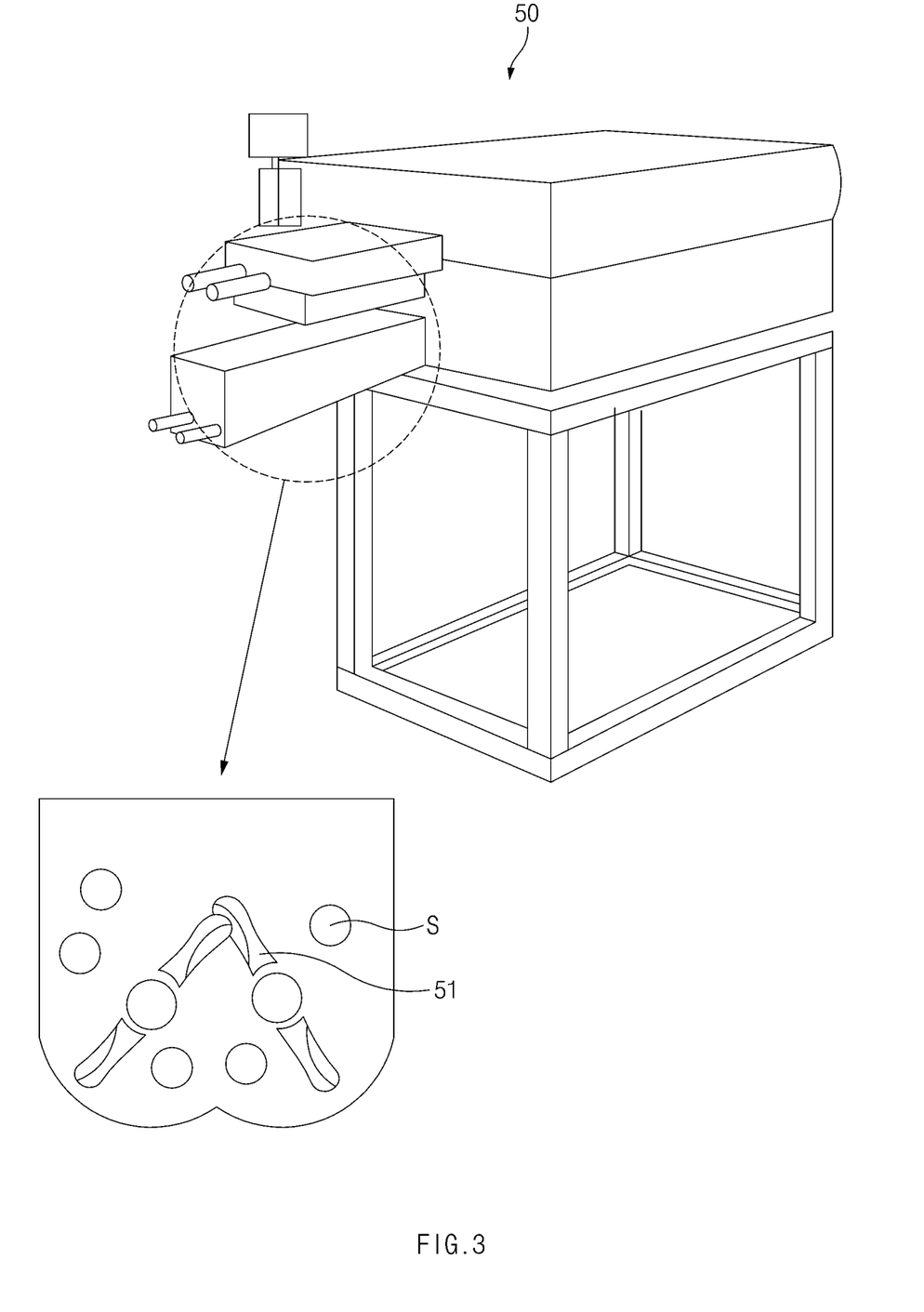
FIG. 3 is a perspective view of a device for stirring a solvent and an electrode active material and a view of an inner blade.

For reference, as described above, the electrode slurry is prepared by dissolving the electrode active material in an organic solvent. The electrode active material is prepared by being stirred in a mixer 50 as illustrated in FIG. 3. Here, as a content of the electrode active material increases, a state of particles S of the electrode active material and the organic solvent are changed into (a) a pendular state (liquid and particles are discontinuously present), (b) a funicular state (a state in which liquid and particles are continuous), (c) a capillary state (a state in which particles and liquid are well combined with each other in a moist state), and (d) a slurry state (a thick state).

Figure 4:
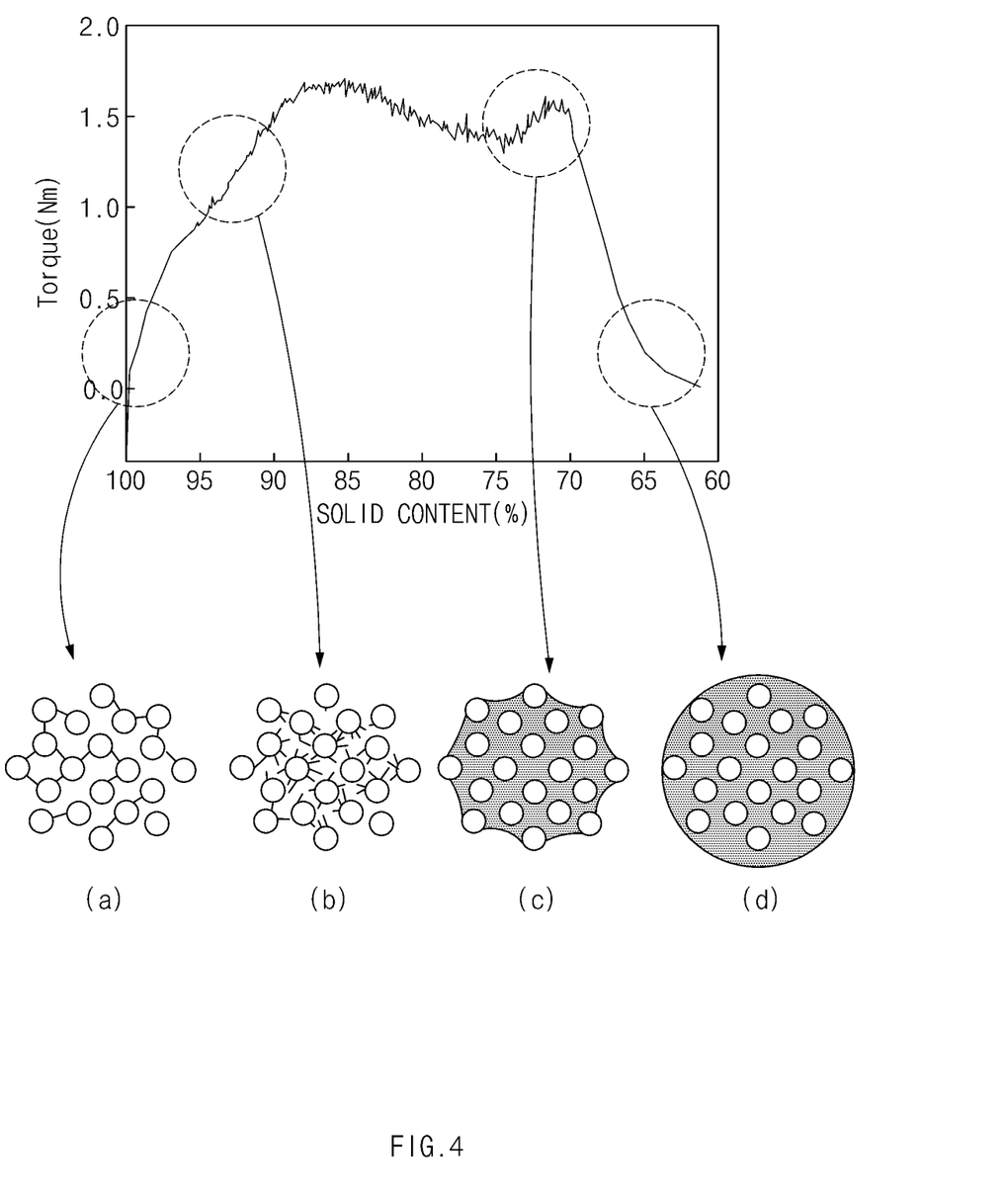
FIG. 4 is a graph illustrating a variation in torque required for a blade of FIG. 3 according to a variation in solid content (%) of electrode slurry applied to the electrode substrate and a view illustrating stirred states of a solvent and an electrode active material.
Figure 5:
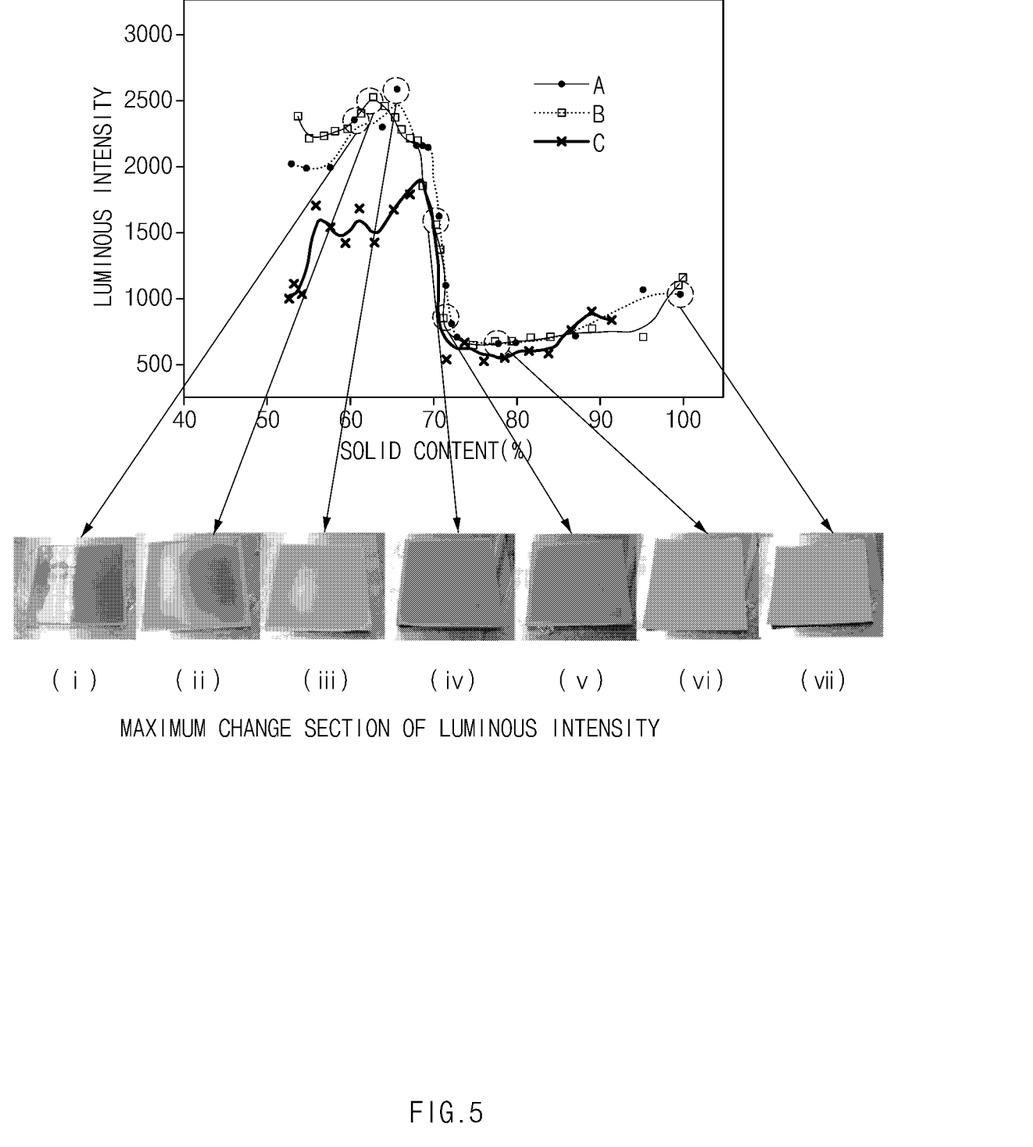
FIG. 5 is a view illustrating a state in which a luminous intensity is changed on a surface of the electrode substrate according to the variation in solid content (%) of the electrode slurry applied to the electrode substrate.

FIG. 4 is a graph illustrating a magnitude of torque according to a solid content (%) of the electrode slurry. The torque means torque required while the blade 51 of the mixer 50 stirs the solvent and the electrode active material. As illustrated in the graph, the torque is highest at a solid content of 72% to 73%. Here, as illustrated in FIG. 5, it is seen that a change in luminous intensity of the electrode slurry is largest when the solid content is 72% to 73% (between iii and iv).

That is, in this embodiment, it is seen that a reflection characteristic of the electrode slurry is most rapidly changed in the vicinity of the solid content at which the torque is the largest when the electrode slurry is stirred. In FIG. 5, lines 'A', 'B', and 'C' indicate characteristics of electrode slurry containing different reference materials. However, it is confirmed that all of the above materials commonly exhibit that the reflection characteristic is most rapidly changed in the vicinity of the solid content at which the torque is the largest when the electrode slurry is stirred.

Thus, in a state of knowing the luminous intensity and/or the reflection characteristic of the electrode slurry according to the drying rate of the electrode substrate 2, when the luminous intensity and/or the reflection characteristic of the electrode slurry being dried are compared, it is possible to estimate a drying rate.

That is, the present invention provides a method of estimating a dry state by utilizing a phenomenon that a change in surface gloss according to drying of the electrode slurry is similar to a change in solid content of the electrode slurry. When the electrode slurry has the highest torque during the stirring, bonding force between the solvent and the solute (the electrode active material) is maximized. Here, the electrode slurry may more efficiently adheres to the surface of the collector. Thus, the method according to the present invention may provide monitoring data in real time to control the drying device so as to secure maximum adhesion.

Reference data showing characteristics of reflected light according to the drying rate of the electrode substrate 2 may be obtained through repeated experiments according to various reference materials, and a computing device 40 may estimate a drying rate by comparing and analyzing measured values and the reference data of received light in a state in which data is previously secured. Furthermore, error correction of the estimated values of the drying rate may also be performed to approach an actual drying rate according to control conditions, variables, and types of the reference material through repetitive experiments.

Also, the monitoring method as described above may be performed in real time at selected one position or at various positions of the drying device 4 having the plurality of drying chambers 4a, 4b and 4c as illustrated in FIG. 1. That is, in the drying device 4 in which the electrode substrate 2 is dried by passing therethrough, a temperature control of each of the drying chambers 4a, 4b and 4c to which heat is applied may be performed based on data of the estimated drying rate of the electrode substrate 2.

Embodiment 2

Also, the present invention additionally provides an apparatus 100 for monitoring a dry state of an electrode substrate 2. At least a portion of the monitoring apparatus 100 provided in this embodiment may be detachably mounted in the drying chamber of the above-described drying device 4 (more particularly, a probe may be mounted inside the drying chamber, and a computing device may be mounted outside the drying chamber) and be manufactured to have sufficient heat resistance against an internal temperature of the drying chamber.

The apparatus 100 is an apparatus for monitoring a drying state of the electrode substrate 2 on which electrode slurry is applied to a collector and comprises a light emitting part 10 emitting light generated in a light source onto a surface of an electrode substrate, a light receiving part 20 receiving the light reflected by the surface of the electrode substrate 2, and a computing device 40 analyzing a luminous intensity and/or a spectrum of the received light and comparing the analyzed characteristics of the light with the reference data of the reflected light to estimate the drying rate of the electrode substrate.

Each of the light emitting part 10 and the light receiving part 20 is made of an optical fiber, through which light is capable of passing, and configured to transmit the light reflected from the light source 11 or transmit the reflected light to the computing device 40. The light emitting part 10 and the light receiving part 20 may be mounted to be built together in the probe 30. That is, the probe 30 has an inner hollow pipe shape, and the light receiving part 20 and the light emitting part 10 are inserted together into the probe.

As illustrated in FIG. 2, in this embodiment, the light receiving part 20 is disposed at a center within the probe 30, and a plurality of light emitting parts 10 are disposed along a circumference of the light receiving part 20. The light emitting part 10 may be configured to emit light having a visible ray band and also configured to selectively emit light having other wavelengths. The probe 30 is disposed so that an end of the probe 30 is spaced a predetermined distance (preferably, 1 mm to 5 mm) from the surface of the electrode substrate 2.

Thus, the light generated in the light source 11 is emitted to the surface of the electrode substrate 2 (in more detail, a surface of the electrode slurry applied to the surface of the collector) through the light emitting part 10, and the reflected light is transmitted to the computing device 40 through the light receiving part 20. Here, the computing device 40 analyzes characteristics of the reflected light to estimate a drying rate.

Since the present invention having the above-described constituents may grasp the dry state without directly contacting the surface of the electrode substrate, the electrode substrate may be prevented from being damaged or scratched on the surface thereof. In addition, since the electrode substrate is not affected by the internal conditions of the drying chamber, the measured result may be improved in reliability.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for monitoring a dry state of an electrode substrate in which electrode slurry having a solid content is applied to a collector, comprising:
    emitting light onto a surface of the electrode substrate;
    receiving light reflected by the surface of the electrode substrate; and
    analyzing a luminous intensity or a spectrum of the received light to estimate a drying rate of the electrode substrate based on the solid content of the electrode substrate,
    wherein the light emitted onto the surface of the electrode substrate is light having a visible ray band wherein the electrode slurry comprises a reference material that is changed in a reflection characteristic according to the dry state.

2. The method of claim 1, wherein,
    when the electrode slurry reaches a drying rate within a specific range,
    the reflection characteristic of the reference material has a section in which the electrode slurry is more sharply changed than that when the electrode slurry is in a drying rate within a different range.

3. The method of claim 1, wherein the reference material is graphite.

4. The method of claim 1, wherein,
    the reflection characteristic of the received light is compared with reference data to estimate the drying rate,
    wherein the reference data is previously written data exhibiting characteristics of the reflected light according to the drying rate of the electrode substrate.

5. The method of claim 1, further comprising drying the electrode substrate in a drying device by passing the electrode substrate through a drying chamber of the drying device to which heat is applied, and
    controlling a temperature of the drying chamber based on data of the estimated drying rate of the electrode substrate.

* * * * *